(12) United States Patent
Ogawa et al.

(10) Patent No.: US 10,410,335 B2
(45) Date of Patent: *Sep. 10, 2019

(54) INSPECTION METHOD AND INSPECTION APPARATUS

(71) Applicant: NuFlare Technology, Inc., Yokohama (JP)

(72) Inventors: Riki Ogawa, Kawasaki (JP); Masatoshi Hirono, Yokohama (JP)

(73) Assignee: NuFlare Technology, Inc., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/003,655

(22) Filed: Jun. 8, 2018

(65) Prior Publication Data
US 2018/0293724 A1    Oct. 11, 2018

Related U.S. Application Data

(62) Division of application No. 15/813,876, filed on Nov. 15, 2017, now Pat. No. 10,007,980, which is a
(Continued)

(30) Foreign Application Priority Data

Feb. 18, 2013   (JP) .................................. 2013-029453

(51) Int. Cl.
*H04N 7/18*     (2006.01)
*G06T 7/00*     (2017.01)

(52) U.S. Cl.
CPC .. *G06T 7/0004* (2013.01); *G06T 2207/10016* (2013.01); *G06T 2207/30148* (2013.01)

(58) Field of Classification Search
CPC ......... G06T 7/0004; G06T 2207/10016; G06T 2207/30148
(Continued)

(56) References Cited

U.S. PATENT DOCUMENTS 6,539,106 B1   3/2003  Gallarda
6,690,469 B1   2/2004  Shibata
(Continued)

FOREIGN PATENT DOCUMENTS

JP    2001-208697    8/2001
JP    2002-221495    8/2002
(Continued)

OTHER PUBLICATIONS

Japanese Office Action dated Sep. 6, 2016 in Application No. 2013-007793, with translation (8 pages).

*Primary Examiner* — Jayanti K Patel
*Assistant Examiner* — Richard B Carter
(74) *Attorney, Agent, or Firm* — Oblon, McClelland, Maier & Neustadt, L.L.P.

(57) ABSTRACT

An inspection method and apparatus comprising, a step of reflecting linearly-polarized light having a predetermined wavelength using an non-polarizing beam splitter after transmitting the linearly-polarized light through a half-wave plate, irradiating a sample with the linearly-polarized light having a polarization plane of a predetermined angle, causing the light reflected by the sample to be incident to an image capturing sensor through a lens, the non-polarizing beam splitter, and an analyzer, and acquiring an optical image of a pattern formed on the sample; acquiring a plurality of optical images by changing an angle of the analyzer or the half-wave plate, and obtaining an angle of the analyzer or the half-wave plate such that a value of ($\sigma/\sqrt{A}$) becomes a minimum; and a step of inspecting whether a defect of the pattern exists, wherein the pattern is a repetitive pattern having a period at a resolution limit or less.

5 Claims, 8 Drawing Sheets

Related U.S. Application Data division of application No. 14/177,546, filed on Feb. 11, 2014, now Pat. No. 9,846,928.

(58) Field of Classification Search
USPC ............... 348/87, 92; 356/369; 382/141
See application file for complete search history.

(56) References Cited

U.S. PATENT DOCUMENTS

| | | | |
|---|---|---|---|
| 2004/0028267 A1* | 2/2004 | Shoham | G01N 21/93 382/141 |
| 2004/0125375 A1* | 7/2004 | Some | G01N 21/211 356/369 |
| 2004/0223141 A1 | 11/2004 | Rosengaus | |
| 2006/0244976 A1 | 11/2006 | Baer et al. | |
| 2007/0002344 A1 | 1/2007 | Klassen | |
| 2011/0249112 A1* | 10/2011 | Endo | G01N 21/956 348/92 |
| 2011/0255770 A1 | 10/2011 | Touya et al. | |
| 2012/0274931 A1 | 11/2012 | Otani et al. | |
| 2013/0176559 A1 | 7/2013 | Ogawa et al. | |
| 2014/0002826 A1 | 1/2014 | Inoue et al. | |
| 2014/0043467 A1 | 2/2014 | Yamashita | |
| 2014/0055774 A1 | 2/2014 | Sugihara et al. | |
| 2014/0055780 A1 | 2/2014 | Ogawa et al. | |
| 2014/0072202 A1 | 3/2014 | Ogawa et al. | |
| 2014/0104412 A1 | 4/2014 | Inoue et al. | |
| 2014/0111636 A1 | 4/2014 | Inoue et al. | |
| 2014/0204202 A1 | 7/2014 | Ogawa et al. | |
| 2014/0232849 A1 | 11/2014 | Ogawa et al. | |

FOREIGN PATENT DOCUMENTS

| | | |
|---|---|---|
| JP | 2006-047308 A | 2/2006 |
| JP | 2006-512588 | 4/2006 |
| JP | 2007-225341 | 9/2007 |
| JP | 4236825 | 3/2009 |
| JP | 2009-192520 | 8/2009 |
| JP | 2012-127856 | 7/2012 |
| JP | 2012185178 | 9/2012 |
| JP | 2014-137358 | 7/2014 |
| WO | WO 2010/050448 | 5/2010 |

\* cited by examiner

INSPECTION METHOD AND INSPECTION APPARATUS

CROSS-REFERENCE TO THE RELATED APPLICATION

The present application is a divisional of U.S. application Ser. No. 15/813,876, filed Nov. 15, 2017, which is a divisional of U.S. application Ser. No. 14/177,546, filed Feb. 11, 2014, now U.S. Pat. No. 9,946,928, issued Dec. 19, 2017, which claims Convention priority from Japanese Patent Application No. 2013-029453, filed on Feb. 18, 2013. The disclosures of all of the above-noted applications are hereby incorporated in their entireties into the present disclosure.

FIELD OF THE INVENTION

The present invention relates to an Inspection Method and Inspection Apparatus.

BACKGROUND

With high integration and large capacity of a Large Scale Integration (LSI), a circuit dimension required for a semiconductor element becomes increasingly narrow. Using an original image pattern (that is, a mask or a reticle, hereinafter collectively referred to as a mask), a reduced-projection exposure apparatus called a stepper or a scanner exposes and transfers the pattern on a wafer to form a circuit, thereby producing the semiconductor element.

It is necessary to improve a production yield for costly LSI production. At this point, a shape defect of the mask pattern can be cited as a large factor that degrades the production yield.

On the other hand, there is a demand for pattern formation having a line width of tens nanometers in a contemporary typical logic device. The shape defect of the mask pattern also becomes finer in such a situation. Because dimension accuracy of the mask is enhanced in order to absorb fluctuations of various process conditions, it is necessary to detect the defect of the extremely small pattern in mask inspection. Therefore, high accuracy is required for an apparatus that evaluates the pattern of a transfer mask used in the LSI production. For example, Japanese Patent No. 4236825 discloses an inspection apparatus that can detect the fine defect on the mask.

Recently, as a technique for forming a fine pattern, nanoimprint lithography (NIL) has attracted attention. In this technique, a template having a nanoscale microstructure is pressured on a specific resist formed on a wafer to form the fine circuit pattern on the resist.

In nanoimprint technology, in order to increase productivity, plural duplicate templates (replica templates) are produced using a master template, that is, of an original plate, and the replica templates are used while attached to different nanoimprint apparatuses. It is necessary that the replica template be produced so as to correspond precisely to the master template. Therefore, it is necessary that not only the pattern of the master template but also the pattern of the replica template be evaluated with high accuracy.

Generally the mask is formed with a dimension four times the circuit dimension. The pattern is reduced and exposed onto a resist on the wafer by a reduced projection exposure device, using the photo-mask, and thereafter, the circuit pattern is developed. On the other hand, in the nanoimprint lithography, the template is formed with magnification equal to the circuit dimension. Therefore, the shape defect in the pattern of the template has the large influence on the pattern transferred onto the wafer compared with the shape defect in the pattern of the mask. Accordingly, it is necessary to evaluate the pattern of the template with higher accuracy compared with the case that pattern of the mask is evaluated.

Recently, with the progress of the fine circuit patterns, the pattern dimension is finer than a resolution of an optical system of a pattern evaluation apparatus. For example, when a line width of the pattern formed in the template is less than 50 nm, the pattern cannot be resolved by a light source of DUV (Deep UltraViolet radiation) light having a wavelength of about 190 nm to about 200 nm. The optical system is relatively easily constructed for the DUV light having the wavelength of about 190 nm to about 200 nm. Therefore, the light source of an EB (Electron Beam) is used. However, unfortunately the light source of the EB is not suitable for quantity production because of low throughput.

There is a demand for an inspection apparatus that can accurately inspect the fine pattern without generating the throughput degradation.

There are various types of defect in the pattern. Among others, a short-circuit defect in which the lines short-circuit to each other and an open-circuit defect in which the line is disconnected have the largest influence on performance of the mask or template. FIG. 1 illustrates an example of the short-circuit defect. The two adjacent lines are connected to each other in a region A1 to generate the short-circuit defect. FIG. 2 illustrates an example of the open-circuit defect. The line is partially disconnected in a region A2.

On the other hand, for the defect in which the edge roughness increases as seen in a region A3 in FIG. 3, the defect has a restrictive influence on the performance of the mask or template.

Even though all defects can be detected, that is, defects that may cause a problem and defects that will not cause a problem, the inspection can be efficiently performed when only the defect that may cause a problem is detected. However, the short-circuit defect, the open-circuit defect, and edge roughness (shown in the region A3 in FIG. 3) are less than or equal to a resolution limit. In the case that the short-circuit defect, the open-circuit defect, and the edge roughness are mixed in a repetitive pattern having a period at the resolution limit or less, brightness and darkness caused by the defect, such as the short-circuit defect and the open-circuit defect, which becomes a problem, and brightness and darkness caused by the edge roughness are not distinguished from each other in observation with the optical system. The same holds true for a bright-field image and a dark-field image. This is because the short-circuit defect, the open-circuit defect, and the edge roughness are identical in size, namely, spread to the size of an extent of the resolution limit in an optical image.

FIG. 4 schematically illustrates a line and space pattern. In FIG. 4, it is assumed that the pattern dimension is smaller than the resolution limit of the optical system. In a region B1 of FIG. 4, the line pattern is partially lacks. In a region B2, the pattern edge roughness increases. The defects are clearly distinguished from each other on an actual substrate. However, the defects cannot be distinguished from each other when observed through the optical system. This is because the optical system acts as a spatial frequency filter that is defined by a wavelength λ of the light emitted from the light source and a numerical aperture NA. FIG. 5 illustrates an example in which the spatial frequency filter is applied to the pattern in FIG. 4. The defect in the region B1 and the defect in the region B2 are identical in size, and the difference of the shape is hardly recognized. Accordingly, the short-circuit defect which is less that the resolution limit is difficult to be distinguished with the defect caused by edge roughness which is also less than the resolution limit.

The present invention has been devised to solve the above problems. An object of the present invention is to provide an inspection apparatus that can accurately inspect the fine pattern without generating the throughput degradation, more particularly an inspection apparatus that can distinguish the defect to be detected from a defect that is not to be detected.

Other challenges and advantages of the present invention are apparent from the following description.

SUMMARY OF THE INVENTION

According to one aspect of the present invention, an inspection method comprising, a step of reflecting linearly-polarized light having a predetermined wavelength emitted from a light source using an non-polarizing beam splitter after transmitting the linearly-polarized light through a half-wave plate, irradiating a sample that becomes an inspection target with the linearly-polarized light having a polarization plane of a predetermined angle, causing the light reflected by the sample to be incident to an image capturing sensor through a lens, the non-polarizing beam splitter, and an analyzer, in this order, and acquiring an optical image of a pattern formed on the sample, a step of acquiring a plurality of optical images by changing an angle of the analyzer or the half-wave plate, and obtaining an angle of the analyzer or the half-wave plate such that a value of ($\sigma/\sqrt{A}$), which is obtained from a standard deviation $\sigma$ of a gray level and an average gray level A in the optical images, becomes a minimum, and a step of inspecting whether a defect of the pattern exists with respect to the optical image that is acquired at the angle of the analyzer or the half-wave plate at which the value of ($\sigma/\sqrt{A}$) becomes the minimum, wherein the pattern is a repetitive pattern having a period at a resolution limit or less, the resolution limit being defined by a wavelength of the light source and a numerical aperture of the lens.

Further to this aspect of the present invention, an inspection method, wherein the pattern is a line and space pattern, and the angle of the half-wave plate is set such that a polarization direction of the light with which the sample is irradiated becomes any angle except an angle in the ranges of −5 degrees to 5 degrees and 85 degrees to 95 degrees with respect to a length direction of a line of the pattern.

Further to this aspect of the present invention, an inspection method, wherein the angle of the half-wave plate is set such that a polarization direction of the light with which the sample is irradiated is in the range of 40 degrees to 50 degrees.

According to another aspect of the present invention, an inspection apparatus comprising, an illumination optical system including a light source that emits linearly-polarized light having a predetermined wavelength, the illumination optical system reflecting the linearly-polarized light emitted from the light source through a half-wave plate using an non-polarizing beam splitter, forming the linearly-polarized light into the linearly-polarized light having a polarization plane of any angle except an angle in ranges of −5 degrees to 5 degrees and 85 degrees to 95 degrees with respect to a repetitive direction of a repetitive pattern formed on a sample that becomes an inspection target, and illuminating the sample, an imaging optical system including an image capturing sensor that obtains an optical image of the pattern formed on the sample, the imaging optical system transmitting the light reflected by the sample through a lens, the non-polarizing beam splitter, and an analyzer, and forming an image of the light on the image capturing sensor, an image processor that obtains an average gray level and a standard deviation in every predetermined unit region in the optical image, and a defect detector that detects a defect of the sample, wherein a resolution limit defined by a wavelength of the light source and a numerical aperture of the lens is a value in which the pattern is not resolved, and the image processor obtains an angle of the analyzer or the half-wave plate from the plurality of optical images acquired by changing the angle of the analyzer or the half-wave plate such that a value of ($\sigma/\sqrt{A}$) obtained from a standard deviation $\sigma$ of a gray level and an average gray level A becomes a minimum.

Further to this aspect of the present invention, an inspection apparatus, wherein the angle of the analyzer or the half-wave plate can arbitrarily be adjusted using a rotating unit, and the angle of the analyzer or the half-wave plate is controlled such that the value of ($\sigma/\sqrt{A}$) acquired by the image processor becomes the minimum.

Further to this aspect of the present invention, an inspection apparatus, comprising a storage unit in which information from the image processor is stored, wherein, with respect to a substrate in which a plurality of patterns having different structures are formed or a plurality of substrates in which single patterns having different structures are formed, the image processor acquires the angle of the analyzer or the half-wave plate in every structure of the pattern from the plurality of optical images acquired by changing the angle of the analyzer or the half-wave plate such that the value of ($\sigma/\sqrt{A}$) obtained from the standard deviation $\sigma$ of the gray level and the average gray level A becomes the minimum, and the image processor transmits the acquired-angle of the analyzer or the half-wave plate to the storage unit, and based on information stored in the storage unit, the angle of the analyzer or the half-wave plate is controlled to acquire the optical image of the pattern formed on the sample.

Further to this aspect of the present invention, an inspection apparatus, wherein the angle of the analyzer or the half-wave plate can arbitrarily be adjusted using a rotating unit, and operation of the rotating unit is controlled based on the information stored in the storage unit.

According to another aspect of the present invention, an inspection apparatus comprising, an illumination optical system including a light source that emits linearly-polarized light having a predetermined wavelength, the illumination optical system reflecting the linearly-polarized light emitted from the light source by a polarizing beam splitter, transmitting the linearly-polarized light through a half-wave plate and a quarter-wave plate, forming the linearly-polarized light into elliptically-polarized light having a major axis in a direction except an angle in the ranges of −5 degrees to 5 degrees and 85 degrees to 95 degrees with respect to a repetitive direction of a repetitive pattern formed on a sample that becomes an inspection target, and illuminating the sample, an imaging optical system including an image capturing sensor that obtains an optical image of the pattern formed on the sample, the imaging optical system transmitting the light reflected by the sample through a lens, the quarter-wave plate, the half-wave plate, and the non-polarizing beam splitter, and forming an image of the light on the image capturing sensor, an image processor that obtains an average gray level and a standard deviation in every predetermined unit region in the optical image, and a defect detector that detects a defect of the sample, wherein a resolution limit defined by a wavelength of the light source and a numerical aperture of the lens is a value in which the pattern is not resolved, and the image processor obtains an angle of the half-wave plate from a plurality of optical images acquired by changing the angle of the half-wave plate such that a value of ($\sigma/\sqrt{A}$) obtained from a standard deviation $\sigma$ of a gray level and an average gray level A becomes a minimum.

Further to this aspect of the present invention, an inspection apparatus, wherein the angle of the half-wave plate can arbitrarily be adjusted using a rotating unit, and the angle of the analyzer and the half-wave plate are controlled such that the value of ($\sigma/\sqrt{A}$) acquired by the image processor becomes the minimum.

Further to this aspect of the present invention, an inspection apparatus, comprising a storage unit in which information from the image processor is stored, wherein, with respect to a substrate in which a plurality of patterns having different structures are formed or a plurality of substrates in which single patterns having different structures are formed, the image processor acquires the angle of the half-wave plate in every structure of the pattern from the plurality of optical images acquired by changing the angle of the half-wave plate such that the value of ($\sigma/\sqrt{A}$) obtained from the standard deviation $\sigma$ of the gray level and the average gray level A becomes the minimum, and the image processor transmits the acquired angle of the half-wave plate to the storage unit, and based on information stored in the storage unit, the angle of the half-wave plate is controlled to acquire the optical image of the pattern formed on the sample.

Further to this aspect of the present invention, an inspection apparatus, wherein the angle of the half-wave plate can arbitrarily be adjusted using a rotating unit, and operation of the rotating unit is controlled based on the information stored in the storage unit.

DETAILED DESCRIPTION OF THE EMBODIMENTS

Figure 3:
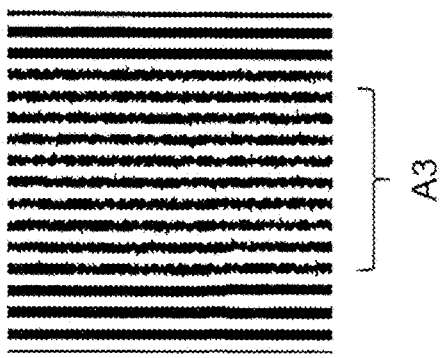
FIG. 3 illustrates an example of the defect in which the edge roughness increases as seen in a region A3.

Many patterns formed on a semiconductor wafer are repetitive patterns such as a line and space pattern, namely, regularly repeating patterns having periodicity, the repetitive pattern is also used in a master pattern and a daughter pattern in the nanoimprint lithography.

In the case that an image of the pattern in which a line width is less than 50 nm is formed with an optical system in which DUV (Deep UltraViolet radiation) light is used, even if a theoretical-limitation lens (numerical aperture NA=1) is used, the pattern can only be resolved by using a liquid immersion technique. However, in the case that the pattern is a repetitive pattern, regularity is disturbed to change a gray level of an optical image near a defect when edge roughness increases in a part of the pattern, or when the pattern is partially lacking. Accordingly, a short-circuit defect, an open-circuit defect, and the defect caused by the edge roughness can be detected by comparing the gray levels of elements. The change in gray level will be described in detail below.

When being acquired with the optical system, an image of fine irregularity (hereinafter referred to as roughness) of a pattern edge located within a range of a dimension corresponding to a resolution limit of the optical system becomes a dull shape having the dimension of almost the resolution limit of the optical system without resolving an individual irregularity shape. Because an amplitude and a frequency of the edge roughness are random, the pattern regularity is disturbed, and the image of the edge roughness is acquired as bright and dark unevenness over a whole range of a sample.

In the case that the pattern is partially lacking, similarly, the image of the fine irregularity is magnified to a size of almost the resolution limit of the optical system. That is, because the regularity is disturbed by the lack of the pattern although the pattern is not resolved, a region near the defect has the gray level different from an average gray level of a surrounding region. The same holds true for the case that the pattern is partially connected to the adjacent pattern.

Thus, the defect can be detected by checking the change in gray level, even if the repetitive pattern has a period that is less than or equal to the resolution of the optical system. However, as described above, the detected defects having the resolution limit or less, namely, the short-circuit defect or open-circuit defect and the bright and dark unevenness caused by the edge roughness are difficult to be distinguished from each other.

The inventor has devised the present invention by paying attention to the fact that the large defects such as the short-circuit defect and the open-circuit defect have a large influence on a polarization state of illumination light compared with the small defects such as the defect caused by the edge roughness. According to the present invention, by controlling the polarization state of the illumination light and a condition of a polarization control element of the optical system forming the image of the light reflected from a substrate that becomes an inspection target, the bright and dark unevenness caused by the edge roughness can be removed with the polarization control element to extract only a change in amplitude of the short-circuit defect or open-circuit defect.

Figure 2:
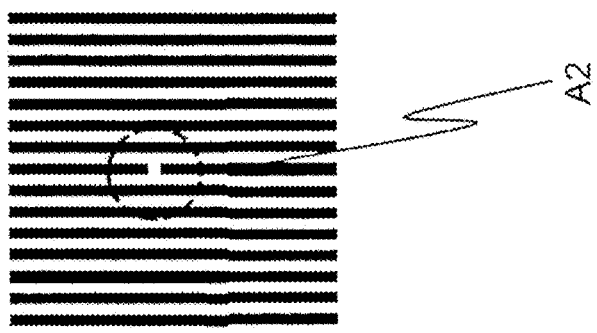
FIG. 2 illustrates an example of the open-circuit defect
Figure 1:
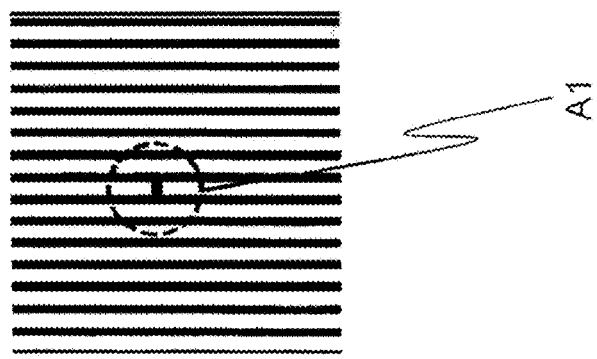
FIG. 1 illustrates an example of the short-circuit defect
Figure 5:
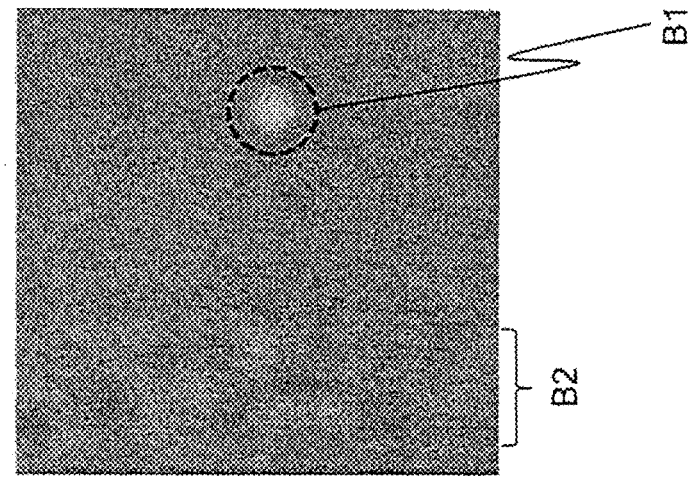
FIG. 5 illustrates an example in which the spatial frequency filter is applied to the pattern in FIG. 4.
Figure 4:
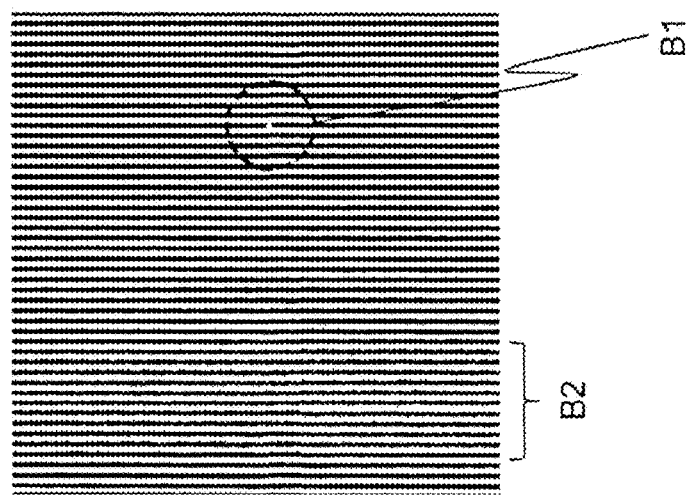
FIG. 4 schematically illustrates a line and space pattern.

For example, for the short-circuit defect in FIG. 1, sensitivity for an electric field component of the illumination light varies between vertical and horizontal directions by connection of lines adjacent to each other. For example, when linearly-polarized light perpendicularly incident to a substrate has a polarization direction of 45 degrees with respect to a direction of a line and space edge, while a vertical component and a horizontal component of the electric field of the incident light are equal to each other, the horizontal component of the electric field of the reflected light is larger than the vertical component due to the short-circuit defect. As a result, the polarization direction of the light reflected from the short-circuit defect is inclined in the direction orthogonal to the direction of the line and space edge. For the open-circuit defect as seen in FIG. 2, the polarization direction is inclined in the direction of the line and space edge.

On the other hand, the defect caused by the edge roughness in FIG. 3 is not the defect caused by lines connected to each other or the defect caused by the line being disconnected. Because an irregularity size in the edge roughness, even if identified as a defect, is finer than the short-circuit defect and the open-circuit defect, there is a small difference in sensitivity between the vertical and horizontal directions of the electric field component of the illumination light. Accordingly, for example, when the linearly-polarized light perpendicularly incident to the substrate has the polarization direction of 45 degrees with respect to the direction of the line and space edge, the polarization direction of the light scattered by the edge roughness becomes a value close to 45 degrees that is of the polarization direction of the incident light. However, because the polarization direction is influenced by a base pattern having a periodic repetition, the polarization direction does not completely become 45 degrees, rather the polarization direction has a value slightly deviated from 45 degrees.

The defect can be classified by taking advantage of the difference of the influence exerted on the polarization state of the illumination light. Specifically, the classification of the defect can be performed using the optical system in FIG. 6.

Figure 6:
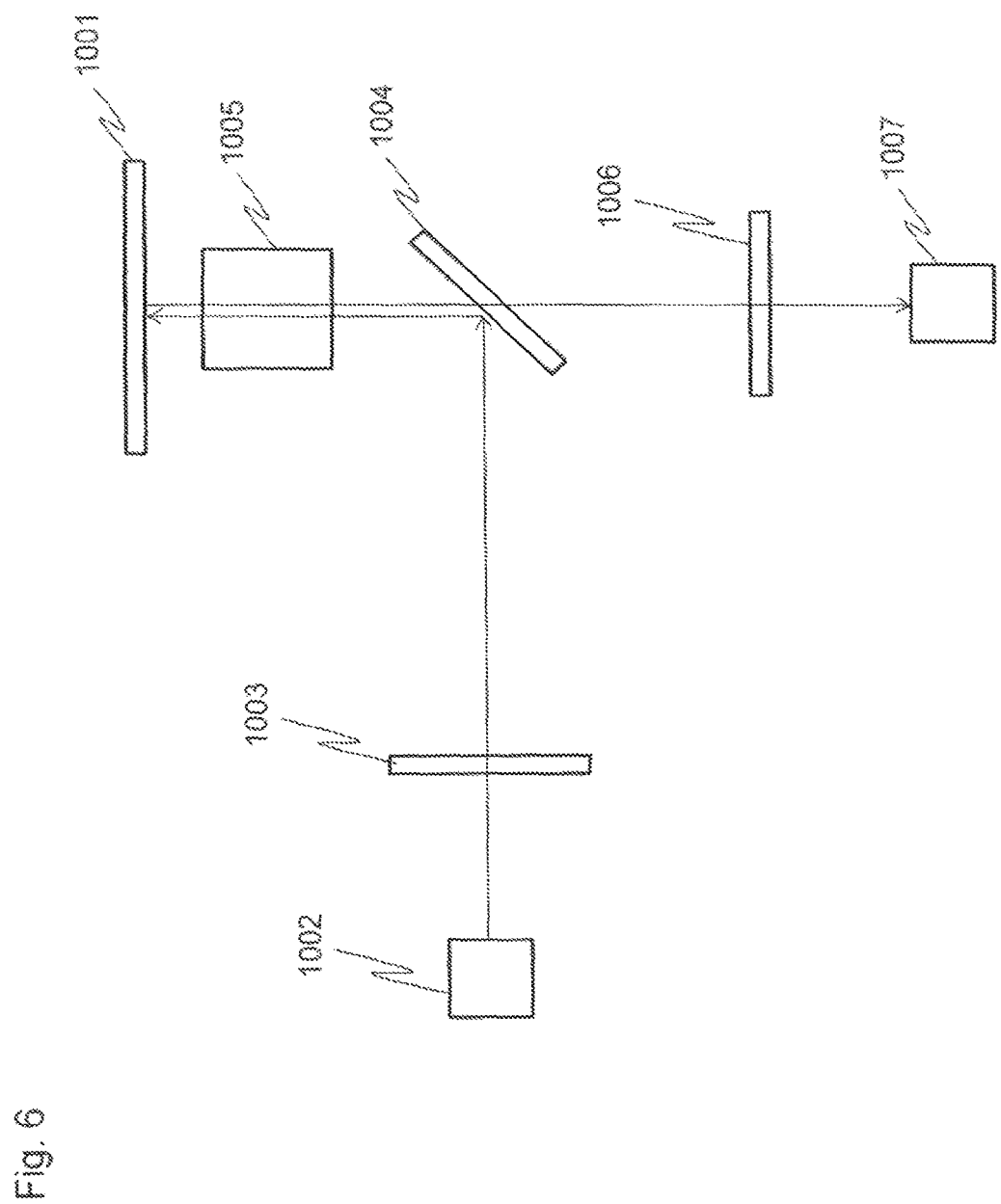
FIG. 6 illustrates the bright-field optical system.

Referring to FIG. 6, the line and space pattern is formed in a mask 1001, that is, the inspection target. At this point, an angle of a half-wave plate 1003 is set such that the linearly-polarized light can be obtained. The linearly-polarized light has a polarization plane in which a polarization direction of the light with which the mask 1001 is illuminated is any angle except an angle in the ranges of −5 degrees to 5 degrees and 85 degrees to 95 degrees, preferably the angle is in the range of 40 degrees to 50 degrees, more preferably the angle is 45 degrees with respect to a length direction of the line of the pattern. Therefore, the difference in sensitivity between a large defect such as a short-circuit defect and the open-circuit defect, and the small defect such as the defect caused by the edge roughness, can emerge with respect to the electric field component of the illumination light. When the illumination light has the polarization plane of 0 degrees or 90 degrees with respect to the length direction of the line of the pattern, because the sensitivity of the illumination light is expressed as, not a change in polarization direction, but only a change in reflectivity, the bright and dark unevenness caused by the edge roughness is not completely removed.

Referring to FIG. 6, the light, which is emitted from a light source 1002 and transmitted through a half-wave plate 1003, is reflected by a non-polarizing beam splitter 1004 to illuminate the mask 1001 through an objective lens 1005. The light reflected by the mask 1001 is incident to an image sensor 1007 after being transmitted through the objective lens 1005, the non-polarizing beam splitter 1004, and an analyzer 1006. As a result, an optical image of the pattern formed on the mask 1001 can be obtained.

As illustrated in FIG. 6, the analyzer 1006 is disposed in the imaging optical system, which allows only the light in the specific polarization direction to be extracted. Specifically, the incidence of the scattering light to the image sensor 1007 from the defect can almost completely be prevented by setting the direction of the analyzer 1006 to the direction orthogonal to the polarization direction of the light scattered by the edge roughness. On the other hand, the light scattered by the short-circuit defect and the open-circuit defect is transmitted through the analyzer 1006, and is incident to the image sensor 1007 because the polarization direction is inclined. Accordingly, the optical image in which the short-circuit defect and the open-circuit defect remain while the bright and dark unevenness caused by the edge roughness is removed can be obtained.

Figure 7:
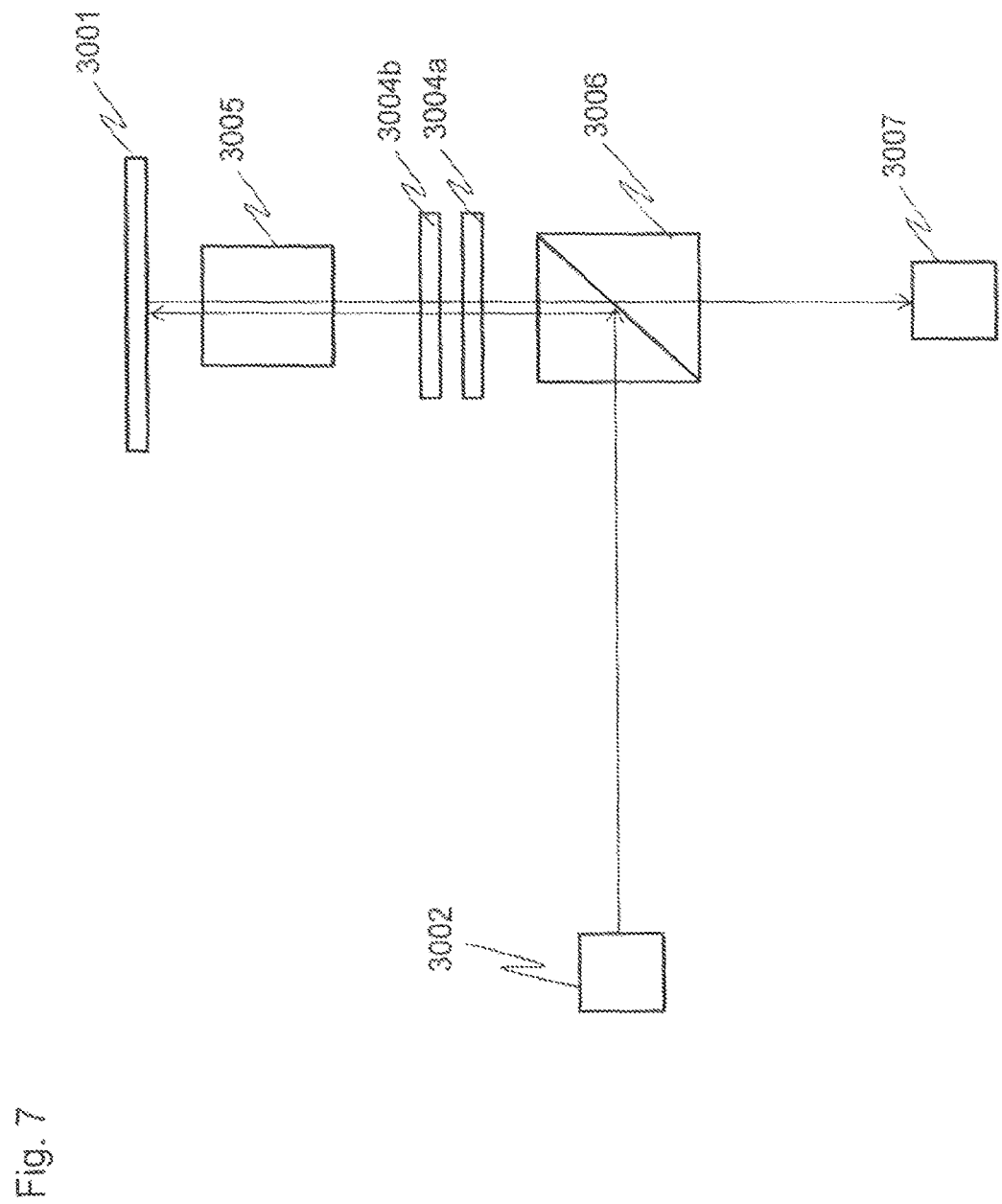
FIG. 7 illustrates a modification of FIG. 6, in which a polarization beam splitter, a quarter-wave plate, and the half-wave plate are used.

FIG. 7 illustrates a modification of FIG. 6. In the example of FIG. 6, a non-polarizing beam splitter such as a half mirror is used. On the other hand, in the example of FIG. 7, a polarization beam splitter, a quarter-wave plate, and the half-wave plate are used. Therefore, a light quantity loss generated in the non-polarizing beam splitter can be avoided.

In FIG. 7, the line and space pattern is formed in a mask 3001, that is, the inspection target. The light emitted from a light source 3002 is reflected in the direction of 90 degrees by a polarization beam splitter 3006, transmitted through a half-wave plate 3004a and a quarter-wave plate 3004b, and focused onto the mask 3001 by an objective lens 3005.

In this case, the angle of the optical axis of the quarter-wave plate 3004b is set such that the elliptically-polarized light is obtained. The elliptically-polarized light has a major axis that exists at any angle except an angle in the ranges of −5 degrees to 5 degrees and 85 degrees to 95 degrees, preferably an angle in the range of 40 degrees to 50 degrees, more preferably an angle of 45 degrees with respect to the length direction of the line of the pattern. Therefore, a longitudinal component and a transverse component of the electric field of the light with which the mask 3001 is illuminated are equal to each other. That is, the difference in sensitivity between the large defect such as the short-circuit defect and the open-circuit defect and the small defect such as the defect caused by the edge roughness can emerge with respect to the electric field component of the illumination light. When the elliptically-polarized light of the illumination light has a major axis direction of 0 degrees or 90 degrees with respect to the length direction of the line, because the sensitivity of the illumination light is expressed as, not the change in polarization direction, but only the change in reflectivity, the bright and dark unevenness caused by the edge roughness is not completely removed.

On the other hand, the half-wave plate 3004a is used to adjust the angle of the polarization direction of the light in order that the scattering light caused by the edge roughness in which the polarization is slightly inclined is removed by the polarization beam splitter 3006.

For example, it is assumed that the plane of light incidence with respect to the polarization beam splitter 3006 is matched with the direction of the repetitive pattern formed in the mask 3001, furthermore, it is assumed that the direction of the optical axis of the half-wave plate 3004a is set to 22.5 degrees with respect to the direction of the repetitive pattern, and that the direction of the optical axis of the quarter-wave plate 3004b is set to 45 degrees with respect to the direction of the repetitive pattern. Assuming that the scattering light of the edge roughness retains the incidence polarized state, characteristics of the light with which the mask 3001 is illuminated and the light reflected by the mask 3001 are expressed as follows. As mentioned below, (PBS) is the polarization beam splitter, ($\lambda/2$) is the half-wave plate, and ($\lambda/4$) is the quarter-wave plate.

(PBS)→0 degrees, linearly-polarized light→(λ/2)→45 degrees, linearly-polarized light→(λ/4)→45 degrees, linearly-polarized light→(reflection surface)→45 degrees, linearly-polarized light→(λ/4)→45 degrees, linearly-polarized light→(λ/2)→0 degrees, linearly-polarized light→(PBS)

As indicated by the change in the characteristic of the light, the polarization direction of the linearly-polarized light exiting from the polarization beam splitter 3006 is identical to the direction of the repetitive pattern (that is, 0 degrees), and the polarization direction of the linearly-polarized light becomes 45 degrees with respect to the direction of the repetitive pattern when being transmitted through the half-wave plate 3004a. The characteristic is unchanged even if the linearly-polarized light is transmitted through the quarter-wave plate 3004b, and the mask 3001 is illuminated with the linearly-polarized light. Then, the light reflected by the mask 3001 is transmitted through the quarter-wave plate 3004b and transmitted through the half-wave plate 3004a, and the polarization direction of the linearly-polarized light becomes identical to the direction of the repetitive pattern. The linearly-polarized light is then incident to the polarization beam splitter 3006.

In the optical system of FIG. 7, the light incident to the polarization beam splitter 3006 is the linearly-polarized light having the polarization direction identical to the direction of the repetitive pattern, and the light is not transmitted through but reflected by the polarization beam splitter 3006. That is, in the case that the scattering light of the edge roughness retains the incidence polarized state, the scattering light is blocked by the polarization beam splitter 3006, and does not reach an image capturing sensor 3007.

It is assumed that the plane of light incidence with respect to the polarization beam splitter 3006 is matched with the direction of the repetitive pattern formed in the mask 3001, that the direction of the optical axis of the half-wave plate 3004a is set to 23 degrees with respect to the direction of the repetitive pattern, and that the direction of the optical axis of the quarter-wave plate 3004b is set to 45 degrees with respect to the direction of the repetitive pattern. Assuming that the scattering light of the edge roughness retains the incidence polarized state, the characteristics of the light with which the mask 3001 is illuminated and the light reflected by the mask 3001 are expressed as follows.

(PBS)→0 degrees, linearly-polarized light→(λ/2)→46 degrees, linearly-polarized light→(λ/4)→45 degrees, elliptically-polarized light→(reflection surface)→45 degrees, elliptically-polarized light→(λ/4)→44 degrees, linearly-polarized light→(λ/2)→2 degrees, linearly-polarized light→(PBS)

In the embodiment, the polarization direction of the linearly-polarized light reflected by the polarization beam splitter 3006 is identical to the direction of the repetitive pattern (that is, 0 degrees), and the polarization direction of the linearly-polarized light becomes 46 degrees with respect to the direction of the repetitive pattern when being transmitted through the half-wave plate 3004a. Then the linearly-polarized light having the polarization direction of 46 degrees becomes the elliptically-polarized light having the polarization direction of 45 degrees with respect to the direction of the repetitive pattern when being transmitted through the quarter-wave plate 3004b. The light is reflected by the mask 3001 and transmitted through the quarter-wave plate 3004b, and the light becomes the linearly-polarized light having the polarization direction of 44 degrees with respect to the direction of the repetitive pattern. Then, the linearly-polarized light is transmitted through the half-wave plate 3004a, and the polarization direction of the linearly-polarized light becomes 2 degrees with respect to the direction of the repetitive pattern. The linearly-polarized light is then incident to the polarization beam splitter 3006.

As described above, when the linearly-polarized light perpendicularly incident to the substrate has the polarization plane of 45 degrees with respect to the optical axis, because the scattering light caused by the edge roughness is influenced by the base pattern having the periodic repetition, the polarization direction does not completely become 45 degrees, but has the value slightly deviating from 45 degrees. On the other hand, in this example, because the polarization direction of the light returning to the polarization beam splitter 3006 can be rotated according to the angle of λ/2, the polarization direction can become 45 degrees by restoring the polarization direction of the scattering light caused by the slightly-inclined edge roughness to the original state. That is, when the scattering light caused by the edge roughness has the polarization direction of 43 degrees, the scattering light is rotated by 2 degrees to set the polarization direction to 45 degrees. Therefore, the scattering light caused by the edge roughness can be completely prevented from being transmitted through the image capturing sensor 3007. Thus, the optical image in which the reflected light caused by the edge roughness is removed can be obtained by adjusting the angle of the half-wave plate 3004a.

FIGS. 6 and 7 illustrate the examples of the bright-field optical system. However, the optical image the defect caused by the edge roughness is removed can be obtained by the polarization even in a dark-field illumination system or a transmission illumination system.

A specific method for finding a condition that removes the defect caused by the edge roughness will be described below. As described above, the defect caused by the edge roughness can be removed from the optical image using the optical systems in FIGS. 6 and 7. However, in order to remove the defect caused by the edge roughness, it is necessary to control the polarization state of the illumination light and the condition of a polarization control element of the optical system that forms the image of the light reflected from the inspection target.

Generally, in the mask or template that becomes the inspection target, many pieces of edge roughness exist over the whole surface while few short-circuit defects or open-circuit defects exist. For example, when the optical image having the region of 100 μm×100 μm is acquired, there is only a small possibility that the short-circuit defect or the open-circuit defect is included in the region, and there are few defects even if the short-circuit defect or the open-circuit defect is included in the region. That is, the brightness and darkness of the optical image in the region is substantially caused by the edge roughness. This means that the condition that removes the defect caused by the edge roughness is obtained by one optical image having the dimension of about 100 μm×about 100 μm.

The change in gray level caused by the edge roughness in the optical image can be removed by controlling the polarization direction of the light incident to the image sensor on the imaging optical system side. Specifically, by controlling the direction of the analyzer in the imaging optical system, a quantity of scattering light that is incident to the image sensor due to the edge roughness can be changed to vary the bright and dark amplitude in the optical image.

The bright and dark amplitude in the optical image can be expressed by a standard deviation of the gray level in each pixel. For example, when the optical system has a pixel resolving power of 50 nm, the optical image having the region of 100 μm×100 μm is expressed by 4 million pixels. That is, a specimen of 4 million gray levels is obtained from the one optical image.

For the dark-field illumination system, the standard deviation is obtained with respect to the sample, the obtained value is defined as an extent of the scattering light caused by the edge roughness, and the polarization state on the imaging optical system side is adjusted such that the value becomes the minimum.

On the other hand, for the optical image in the bright-field optical system, the extent of the brightness and darkness caused by the edge roughness is influenced by zero-order light. The reason is as follows. Because the fine periodic pattern that is less than or equal to the resolution limit exists in the inspection target, the polarization state of the zero-order light changes due to a phase-difference effect caused by structural birefringence. Therefore, the light quantity that becomes a base also changes when the analyzer or the half-wave plate is rotated in order to remove the reflected light caused by the edge roughness. Because the bright-field image is a product of the electric field amplitude of the scattering light from the short-circuit defect, the open-circuit defect, or the edge roughness and the electric field amplitude of the zero-order light, the extent of the brightness and darkness caused by the edge roughness is influenced by the intensity of the zero-order light as described above.

Figure 8:
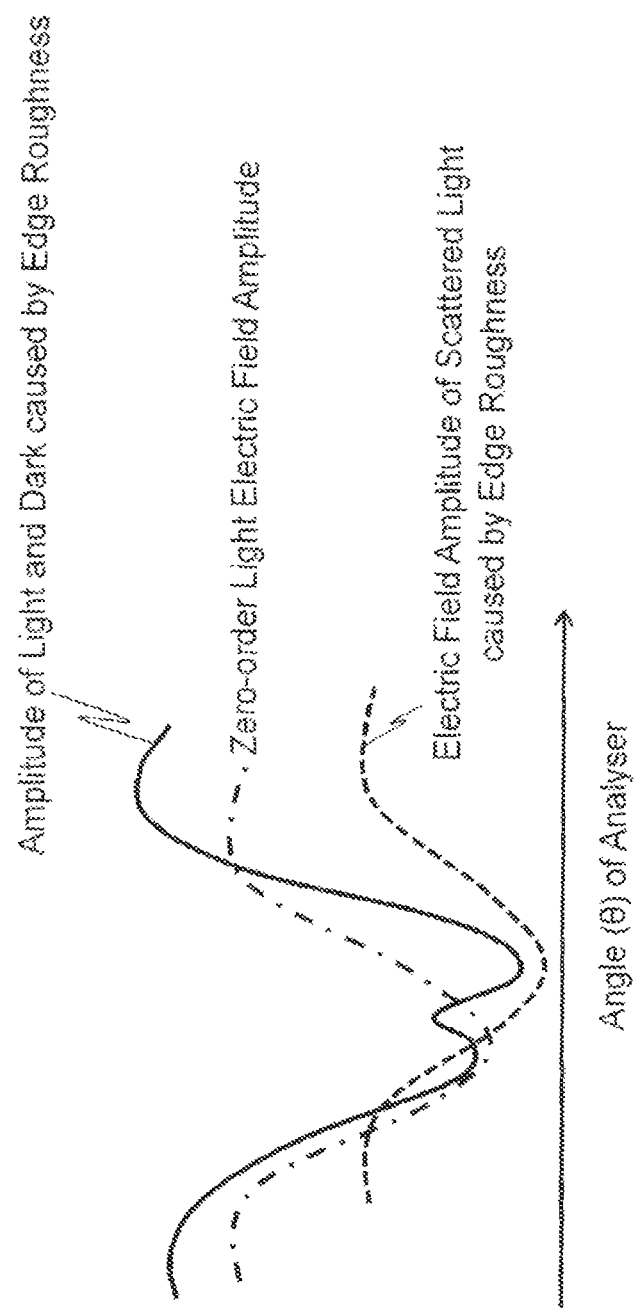
FIG. 8 illustrates angle dependence on the analyzer with respect to the amplitude of the brightness and darkness caused by the edge roughness, the electric field amplitude of the scattering light, and the electric field amplitude of the zero-order light.

FIG. 8 illustrates angle dependence on the analyzer with respect to the amplitude of the brightness and darkness caused by the edge roughness, the electric field amplitude of the scattering light, and the electric field amplitude of the zero-order light. In the bright-field optical system, when the polarization state of the scattering light caused by the edge roughness is not matched with the polarization state of the zero-order light influenced by the structural birefringence, the angle dependence that is the product of both on the analyzer with respect to the amplitude of the brightness and darkness caused by the edge roughness has two local minima as illustrated in FIG. 8.

The reason the amplitude of the brightness and darkness caused by the edge roughness is expressed by the product of the electric field amplitude of the reflecting light from the defect caused by the edge roughness and the electric field amplitude of the zero-order light will be described below.

It is assumed that the electric field amplitude of the zero-order light is as follows.

$$E_0 = f(\theta)$$

The electric field amplitude of the scattering light caused by the edge roughness is described as follows.

$$E_r = g(\theta)$$

The zero-order light becomes elliptically-polarized light having a long axis in a predetermined direction by the influence of the birefringence caused by the fine pattern. Therefore, $f(\theta)$ has one local maximum in the range θ of 0 degrees to 180 degrees, and becomes a function having the local minimum greater than 0. On the other hand, in the scattering light caused by the edge roughness, because the roughness does not have the periodicity, the phase difference is small, if any, and the linear polarization is substantially maintained. Therefore, $g(\theta)$ has one local minimum in the range θ of 0 degrees to 180 degrees, and becomes a function having the local minimum close to 0.

As indicated by the following equation, a signal intensity I of the bright-field image is expressed by interference between the electric field of the zero-order light and the electric field of the scattering light caused by the edge roughness.

$$I = <|E_0 \exp\{i(\omega t)\} + E_r \exp\{i(\omega t + \phi)\}|^2> = E_0^2 + E_r^2 + 2E_0 E_r \cos(\phi)$$

In the above equation, because $E_0^2$ is a square of the zero-order light, namely, a base light quantity $I_0$, an amplitude $I_r$ of the brightness and darkness caused by the edge roughness is expressed by the following equation.

$$I_r = I - I_0 = E_r^2 + 2E_0 E_r \cos(\phi)$$

Where ϕ is the phase difference between the zero-order light and the scattering light, and depends on a focal position of the substrate. For example, the following equation is considered as the condition that the brightness and darkness caused by the edge roughness become the strongest.

$$\cos(\phi) = 1$$

Even though the edge roughness is extremely fine, as described above with reference to FIG. 8, the electric field amplitude of the zero-order light does not become zero due to the influence of the birefringence even if the angle θ of the analyzer is changed and thus, is approximated as follows.

$$E_r << E_0$$

Accordingly, the amplitude of the brightness and darkness caused by the edge roughness can be simplified as expressed by the following equation.

$$I_r = 2E_0 E_r$$

Therefore, in the periodic pattern that is less than or equal to the resolution limit, the amplitude of the brightness and darkness caused by the edge roughness is expressed by the product of the electric field amplitude of the zero-order light and the electric field amplitude of the scattering light caused by the edge roughness.

As described above, because the $E_0$ and $E_r$ depend on the angle θ of the analyzer, $I_r$ is expressed by the following equation.

$$I_r = 2f(\theta)g(\theta)$$

Accordingly, in the case that the value of the angle θ at which the function $f(\theta)$ becomes the minimum differs from the value of the angle θ at which the function $g(\theta)$ becomes the minimum, $I_r$ that is of the product of $f(\theta)$ and $g(\theta)$ has the two local minima.

In order to remove the influence of the scattering light caused by the edge roughness and improve sensitivity for detecting the short-circuit defect or the open-circuit defect, it is necessary to find, not the condition that the function $f(\theta)$ caused by the zero-order light becomes the minimum, but the condition that the function $g(\theta)$ caused by the edge roughness becomes the minimum. This is because the minimum of the function $f(\theta)$ is only the condition that the base light quantity becomes the minimum and therefore the influence of the edge roughness is hardly removed.

The condition that the function $f(\theta)$ becomes the minimum is obtained by a calculation using a standard deviation σ of the gray level of the optical image and an average gray level A. The standard deviation σ includes various noise factors, and particularly the standard deviation σ is largely influenced by the brightness and darkness caused by the edge roughness. Therefore, the standard deviation σ can be regarded as the following equation.

$$\sigma \propto I_r = 2f(\theta)g(\theta)$$

Because the average gray level A of the optical image is the base light quantity, namely, the intensity of the zero-order light, the average gray level A is expressed as follows.

$$A \propto I_0 = E_0^2 = f(\theta)^2$$

Accordingly, the function g(θ) is obtained by the following equation.

$$g(\theta) \propto \sigma/f(\theta) = \sigma/\sqrt{A}$$

Thus, the electric field amplitude of the scattering light caused by the edge roughness is proportional to a value in which the standard deviation σ of the optical image is divided by a square root of the average gray level A. In order to find the condition that minimizes the amplitude of the brightness and darkness caused by the edge roughness, the optical image is acquired while the angle θ of the analyzer is varied, and the value in which the standard deviation of the gray level in the acquired optical image is divided by the square root of the average gray level. Then the angle θ is obtained such that the value becomes the minimum.

Figure 9:
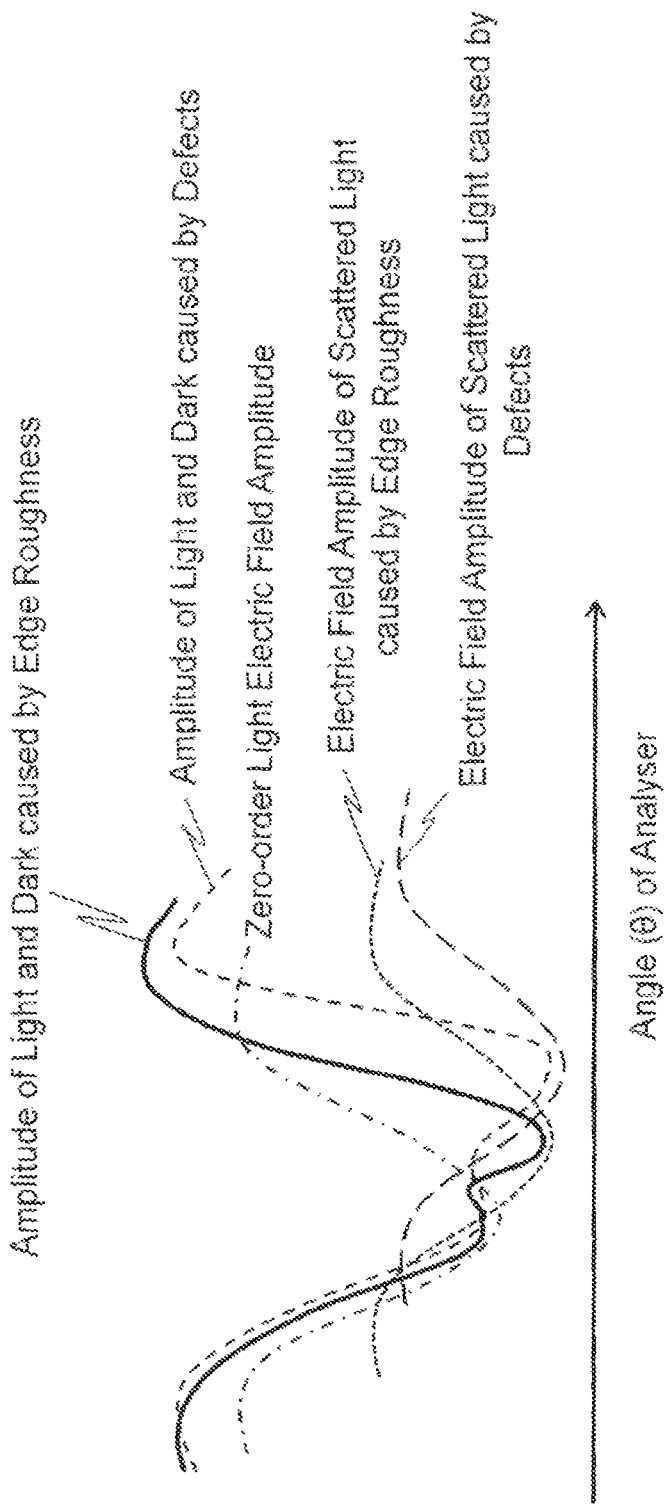
FIG. 9 illustrates the angle dependence on the analyzer, in which the amplitude of the brightness and darkness caused by the short-circuit defect or the open-circuit defect and the electric field amplitude of the scattering light are added to that of FIG. 8.

FIG. 9 illustrates the angle dependence on the analyzer, in which the amplitude of the brightness and darkness caused by the short-circuit defect or the open-circuit defect and the electric field amplitude of the scattering light are added to that of FIG. 8. As described above, in the large defect such as the short-circuit defect and the open-circuit defect, the vertical direction and the horizontal direction differ from each other in the sensitivity with respect to the electric field component of the illumination light. Accordingly, when the electric field amplitude of the scattering light caused by the large defect becomes the minimum, the angle θ of the analyzer differs from that of the scattering light caused by the edge roughness. That is, even if the angle θ is applied when the electric field amplitude of the scattering light caused by the edge roughness becomes the minimum, the electric field amplitude of the reflected light caused by the short-circuit defect or the open-circuit defect does not become the minimum. Therefore, the short-circuit defect and the open-circuit defect can be detected without being buried in the amplitude of the brightness and darkness caused by the edge roughness.

When the electric field amplitude of the scattering light caused by the edge roughness becomes the minimum, the value of the angle θ depends on a structure of the pattern formed in the inspection target. For example, the value of the angle θ at which the electric field amplitude becomes the minimum also changes when a pitch, a depth, or a line and space ratio of the pattern changes.

The angle θ is obtained in every substrate that becomes the inspection target when the electric field amplitude of the scattering light caused by the edge roughness becomes the minimum.

One example, for obtaining the value of the angle θ will be described using the inspection apparatus provided with the bright-field optical system as shown in FIG. 6. First, before the inspection, the optical image of the substrate that becomes the inspection target is acquired, and the standard deviation σ of the gray level and the average gray level A of the optical image are calculated. The condition that function g(θ), which expresses the electric field amplitude of the reflected light caused by the edge roughness, becomes the minimum is obtained by the calculation using the standard deviation σ of the gray level and the average gray level A of the optical image. That is, as expressed by the following expression, the function g (θ) is proportional to a value in which the standard deviation σ of the gray level of the optical image is divided by a square root of the average gray level A.

$$g(\theta) \propto \sigma/\sqrt{A}$$

In order to find the condition that minimizes the bright and dark amplitude caused by the edge roughness, the value of (σ/√A) is obtained from the angle θ of the analyzer and the average gray level A. The angle θ at which the value of (σ/√A) becomes the minimum, specifically the angle θ of the analyzer in the bright-field optical system is determined. Alternatively, the angle θ may be determined by setting the angle of the half-wave plate to θ.

In the case that the bright-field optical system includes a light source that emits linearly-polarized light, a half-wave plate, an non-polarizing beam splitter, and an analyzer, while the half-wave plate is disposed between the light source and the non-polarizing beam splitter, the angle of the half-wave plate is desirably set, such that the polarization direction of the light with which the substrate is illuminated, at 0 degrees or an angle near 0 degrees, and 90 degrees or an angle near 90 degrees with respect to the pattern formed on the substrate, specifically any angle except an angle in the ranges of −5 degrees to 5 degrees and 85 degrees to 95 degrees.

On the other hand, for the inspection apparatus provided with the dark-field optical system, the optical image of the substrate that becomes the inspection target is acquired before the inspection, and the standard deviation a of the gray level of the optical image is calculated. The angles of the wave plate and analyzer, which are provided in the dark-field optical system, are adjusted such that the standard deviation a becomes the minimum.

In another method for obtaining the angle θ, the optimum angle θ is previously obtained in every structure of the pattern formed on the substrate that becomes the inspection target. Before the inspection, the angle θ at which the electric field amplitude of the scattering light caused by the edge roughness becomes the minimum, is obtained using a substrate different from the inspection target. It is assumed that plural patterns having different structures are formed on the surface of the substrate, and the angle θ is then obtained for every structure of the pattern. A table for showing the structure of the pattern and the corresponding optimum angle θ is formed and stored in a storage unit provided in the inspection apparatus, and the table suitable to the substrate that becomes the inspection target is used during the inspection.

One example, for obtaining the value of the angle θ will be described using the inspection apparatus provided with the bright-field optical system as shown in FIG. 6. Using the substrate in which plural patterns having different pattern pitches, pattern depths, or line and space ratios are provided, an optical image of the substrate is acquired. Then, the standard deviation σ of the gray level and the average gray level A of the acquired optical image are calculated in every structure of the pattern. The value of (σ/√A) is obtained in every structure of the pattern from the standard deviation σ and the average gray level A, and the angle θ at which the value of (σ/√A) becomes the minimum, namely, the angle θ of the analyzer in the bright-field optical system is determined. Alternatively, the angle θ may be determined by setting the angle of the half-wave plate to θ. The table for the acquired angle θ and the table for the corresponding structure of the pattern are formed and stored in the storage unit. During the inspection, the angle θ corresponding to the pattern that becomes the inspection target is found out from the table, and the angle of the analyzer (or half-wave plate) is set to the value (θ).

In the case that a bright-field optical system includes a light source that emits the linearly-polarized light, a half-wave plate, a non-polarizing beam splitter, and an analyzer, while the half-wave plate is disposed between the light source and the non-polarizing beam splitter, the angle of the half-wave plate is desirably set, such that the polarization direction of the light with which the substrate is illuminated, at 0 degrees or an angle near 0 degrees, and 90 degrees or an angle near 90 degrees with respect to the pattern formed on the substrate, specifically any angle except an angle in the ranges of −5 degrees to 5 degrees and 85 degrees to 95 degrees.

On the other hand, for the inspection apparatus provided with the dark-field optical system, the optical image of the substrate different from the substrate that becomes the inspection target is acquired before the inspection, and the standard deviation σ of the gray level and the average gray level A of the optical image are calculated in every structure of the pattern. At this point, as one example, the structure of the pattern refers to the pattern pitch, the pattern depth, or the line and space ratio. The angles at which the acquire standard deviation σ becomes the minimum, namely, the angles of the wave plate and analyzer that are provided in the dark-field optical system are determined. The table for the structure of the pattern, and the corresponding angles of the wave plate and analyzer is formed and stored in the storage unit of the inspection apparatus. During the inspection, the angle corresponding to the pattern that becomes the inspection target is found out from the table, and the wave plate and analyzer are set to the corresponding angles.

In the method in which the angle θ is obtained in every substrate that becomes the inspection target when the electric field amplitude of the scattering light caused by the edge roughness becomes the minimum, because the optimum angle θ of the actual inspection target is obtained, the scattering light caused by the edge roughness can more surely be reduced from the optical image used in the inspection. On the other hand, in the method for obtaining the optimum angle θ in every structure of the pattern formed on the substrate that becomes the inspection target, the whole inspection time can be shortened because it is not necessary to obtain the angle θ in every inspection.

An inspection apparatus of the embodiment will be described below.

Figure 10:
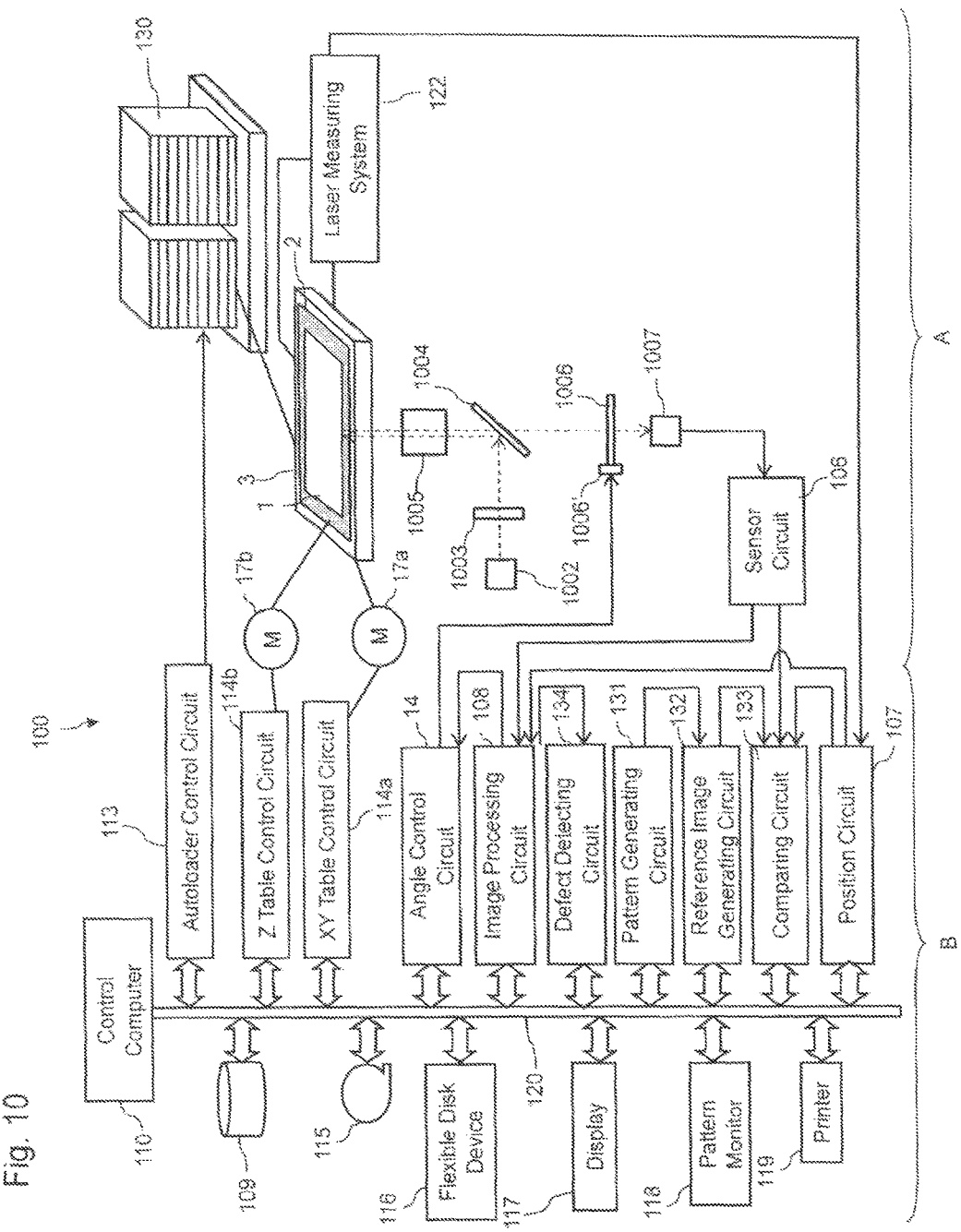
FIG. 10 is a configuration diagram of an inspection apparatus 100 of the present embodiment.

FIG. 10 is a configuration diagram of an inspection apparatus 100 of the present embodiment. The inspection apparatus 100 includes the inspection optical system illustrated in FIG. 6. Referring to FIG. 10, the angle of the analyzer 1006 can arbitrarily be adjusted by a rotating unit 1006'. The rotating unit 1006' is controlled by an angle control circuit 14.

As illustrated in FIG. 10, the inspection apparatus 100 includes an optical image acquiring unit A and a controller B.

The optical image acquiring unit A includes an XY-table 3 that is movable in a horizontal direction (an X direction and a Y direction), a sensor circuit 106, a laser measuring system 122, and an autoloader 130 in addition to the inspection optical system described in FIG. 6. The XY-table 3 may have a structure movable in a rotation direction (θ direction) in addition to the horizontal direction.

A sample 1 that becomes the inspection target is placed on a Z-table 2. The Z-table 2 is provided on the XY-table 3, and is horizontally movable together with the XY-table 3. A repetitive pattern such as the line and space pattern, namely, a regularly repeating pattern having a periodicity is formed on the sample 1. The template used in the nanoimprint technology can be cited as an example of the sample 1.

Preferably the sample 1 is supported at three points using support members provided in the Z-table 2. In the case that the sample 1 is supported at four points, it is necessary to adjust a height of the support member with high accuracy. Unless the height of the support member is sufficiently adjusted, there is a risk of deforming the sample 1. On the other hand, in the three-point support, the sample 1 can be supported while the deformation of the sample 1 is suppressed to the minimum. The supporting member is configured by using a ballpoint having a spherical head surface. For example, the two support members in the three support members are in contact with the sample 1 at two corners, which are not diagonal but adjacent to each other in four corners of the sample 1. The remaining support member in the three support members is disposed in the region between the two corners at which the two other support members are not disposed.

The light source 1002 emits the light to the sample 1 in order to acquire the optical image of the sample 1. A wavelength of the light emitted from the light source 1002 is at least double the pattern pitch. The inspection apparatus 100 is suitable for the inspection of an ultrafine pattern having a line width of 50 to 60 nm or less, and preferably a light source that emits DUV (Deep UltraViolet radiation) light is used as the light source 1002. The use of the DUV light can relatively simply configure the optical system, and inspect the fine pattern with throughput higher than that of an EB (Electron Beam).

The resolution limit of the optical system in the inspection apparatus 100, namely, the resolution limit (R=λ/2NA) defined by the wavelength (λ) of the light emitted from the light source 1002 and a numerical aperture (NA) of the objective lens 1005 is the value that does not resolve the pattern formed on the sample 1.

In an illumination optical system, the light emitted from the light source 1002 is transmitted through the half-wave plate 1003 and reflected by the non-polarizing beam splitter 1004, and the sample 1 is irradiated with the light through the objective lens 1005. The light reflected by the sample 1 is incident to the image capturing sensor 1007 through the objective lens 1005, the non-polarizing beam splitter 1004, and the analyzer 1006. The optical image of the pattern formed on the sample 1 is thus obtained.

The light with which the sample 1 is illuminated is the linearly-polarized light having the polarization plane of 45 degrees with respect to the optical axis. Therefore, the difference in sensitivity between the large defect such as the short-circuit defect, the open-circuit defect, and the small defect such as the defect caused by the edge roughness can emerge with respect to the electric field component of the illumination light.

In the inspection apparatus 100, the imaging optical system includes the analyzer 1006, which allows only the light having the specific polarization direction to be extracted. Specifically, the direction of the analyzer 1006 is set to the direction orthogonal to the polarization direction of the light scattered by the defect of the edge roughness, whereby the scattering light from the defect can almost completely be prevented from being incident to the image capturing sensor 1007. On the other hand, for the light scattered by the short-circuit defect or the open-circuit defect, because the polarization direction inclines, the light is incident to the image capturing sensor 1007 through the analyzer 1006. Accordingly, an optical image in which a short-circuit defect or an open-circuit defect remains while the defect caused by the edge roughness is removed can be obtained.

The controller B in FIG. 10 will be described below.

In the controller B, a control computer 110 that controls the whole inspection apparatus 100 is connected to a position circuit 107, an image processing circuit 108, the angle control circuit 14, an pattern generating circuit 131, a reference image generating circuit 132, a comparing circuit 133, a defect detecting circuit 134, an autoloader control circuit 113, a XY-table control circuit 114a, a Z-table control circuit 114b, a magnetic disk unit 109, a magnetic tape unit 115, and flexible disk unit 116, which are examples of a storage unit, a display 117, a pattern monitor 118, and a printer 119 through a bus 120 that constitutes a data transmission line. The image processing circuit 108 corresponds to the image processor of the present invention, the defect detecting circuit 134 corresponds to the defect detector of the present invention, and the magnetic disk unit 109 corresponds to the storing unit of the present invention.

The Z-table 2 is driven by a motor 17b that is controlled by a Z-table control circuit 114b. The XY-table 3 is driven by a motor 17a that is controlled by an XY-table control circuit 114a. A linear motor, as one example, can be used as each motor.

In the optical image acquiring unit A in FIG. 10, the image sensor 1007, acquires the optical image of the sample 1. An example of the specific method for acquiring the optical image will be described below.

The sample 1 is placed on the vertically movable Z-table 2. The Z-table 2 is also horizontally movable by the XY-table 3. The laser measuring system 122 measures a moving position of the XY-table 3, and transmits the moving position to the position circuit 107. The sample 1 on the XY-table 3 is automatically conveyed from the autoloader 130 that is driven by the autoloader control circuit 113, and the sample 1 is automatically discharged after the inspection is ended.

The light source 1002 emits the light with which the sample 1 is irradiated. The light emitted from the light source 1002 is transmitted through the half-wave plate 1003, reflected by the non-polarizing beam splitter 1004, and focused onto the sample 1 through the objective lens 1005. Desirably the angle of the half-wave plate 1003 is set such that the polarization direction of the light with which the sample 1 is illuminated at 0 degrees or an angle near 0 degrees, and 90 degrees or an angle near 90 degrees with respect to the pattern formed on the substrate, specifically any angle except an angle in the ranges of −5 degrees to 5 degrees and 85 degrees to 95 degrees. A distance between the objective lens 1005 and the sample 1 is adjusted by perpendicularly moving the Z-table 2.

The light reflected by the sample 1 is incident to the image capturing sensor 1007 through the objective lens 1005, the non-polarizing beam splitter 1004, and the analyzer 1006. The optical image of the pattern formed on the sample 1 is thus obtained.

Figure 11:
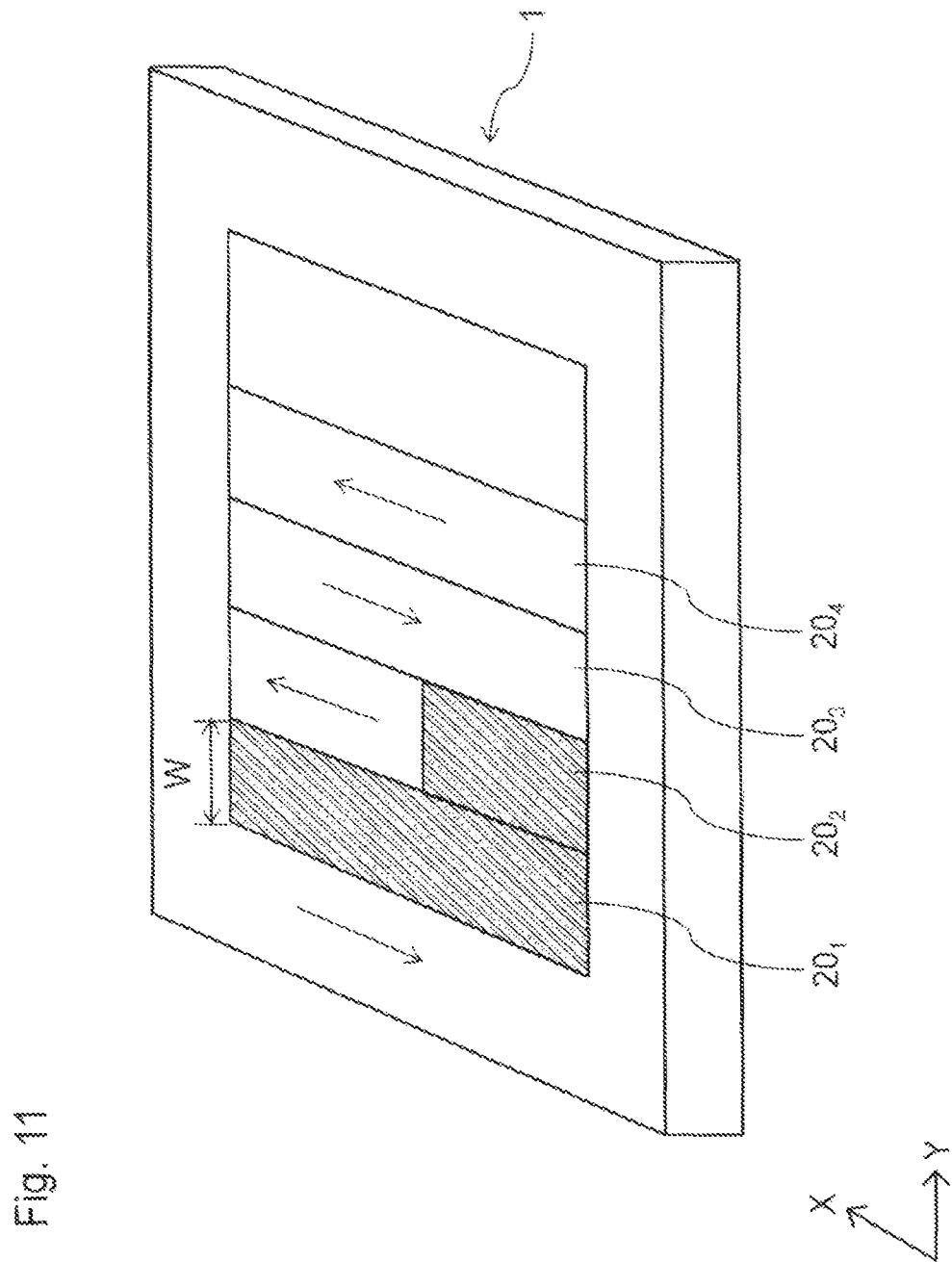
FIG. 11 is a view illustrating a procedure to acquire the optical image of the pattern formed in the sample 1.

FIG. 11 is a view illustrating a procedure to acquire the optical image of the pattern formed in the sample 1.

As illustrated in FIG. 11, an evaluation region on the sample 1 is virtually divided into plural strip-like frames $20_1, 20_2, 20_3, 20_4, \ldots$. The XY-table control circuit 114a controls motion of the XY-table 3 in FIG. 10 such that the frames $20_1, 20_2, 20_3, 20_4, \ldots$ are continuously scanned. Specifically, the images having a scan width W as illustrated in FIG. 11 are continuously input to the measuring image sensor 1007 while the XY-table 3 moves in the X-direction.

That is, after the image of the first frame 201 is acquired, the image of the second frame $20_2$ is acquired. In this case, the optical image is acquired while the XY-table 3 moves in the opposite direction to the direction in which the image of the first frame $20_1$ is acquired, and the images having the scan width W are continuously input to each image sensor. In the case that the image of the third frame $20_3$ is acquired, the XY-table 3 moves in the opposite direction to the direction in which the image of the second frame $20_2$ is acquired, namely, the direction in which the image of the first frame $20_1$ is acquired. A hatched-line portion in FIG. 11 schematically expresses the region where the optical image is already acquired in the above way.

After the image of the pattern formed the-measuring image sensor 1007 illustrated in FIG. 10, is subjected to photoelectric conversion, the sensor circuit 106 performs A/D (analog-digital) conversion to the image. For example, the line sensor in which CCD cameras that are of the image acquiring elements are arrayed in line is used as each image sensor. A TDI (Time Delay Integration) sensor can be cited as an example of the line sensor. In this case, the image of the pattern in the sample 1 is acquired by the TDI sensor while the XY-table 3 continuously moves in the X-axis direction.

The optical image data to which the sensor circuit 106 performs the A/D conversion is transmitted to the image processing circuit 108. In the image processing circuit 108, the optical image data is expressed by the gray level in each pixel. Then, in the image processing circuit 108, the standard deviation σ of the gray level and the average gray level A are obtained with respect to the acquired optical image, and the value of (σ/√A) is calculated from the standard deviation σ and the average gray level A.

In the present embodiment, the angle of the analyzer 1006 is changed to acquire plural optical images, and the values of (σ/√A) obtained from the optical images are plotted with respect to the angle (θ) of the analyzer 1006. As described above, the electric field amplitude of the reflected light caused by the edge roughness is proportional to the value in which the standard deviation σ of the gray level of the optical image is divided by the square root of the average gray level A. Therefore, the angle θ of the analyzer is obtained when the value of (σ/√A) becomes the maximum, thereby determining the condition that minimizes the bright and dark amplitude caused by the edge roughness.

The information on the angle θ determined by the image processing circuit 108 is transmitted to the angle control circuit 14. The angle control circuit 14 then controls the angle of the analyzer 1006. Specifically, the angle control circuit 14 controls operation of the rotating unit 1006' such that the angle of the analyzer 1006 becomes the angle θ acquired by the image processing circuit 108.

In the present embodiment, the angle θ of the analyzer is obtained when the value of (σ/√A) becomes the minimum. Alternatively, the angle of the half-wave plate 1003 may be obtained when the value of (σ/√A) becomes the minimum. In this case, the half-wave plate 1003 includes a rotating unit, and the angle control circuit 14 controls the operation of the rotating unit, whereby the angle of the half-wave plate 1003 becomes the angle θ acquired by the image processing circuit 108.

By controlling the polarization state of the illumination light and a condition of a polarization control element of the optical system forming the image of the light reflected from a substrate that becomes an inspection target, the bright and dark unevenness caused by the edge roughness can be removed with the polarization control element to extract only a change in amplitude of the short-circuit defect or open-circuit defect. That is, the defect caused by the edge roughness is removed in the optical image obtained by the image sensor 1007. As described above, the optical image data is transmitted to the image processing circuit 108 through the sensor circuit 106.

As mentioned above, in the image processing circuit 108, the pixel data in the optical image (in which the defect caused by the edge roughness is removed) is expressed by the gray level in each pixel. The inspection region of the sample 1 is divided into predetermined unit regions, and the average gray level of each unit region is obtained. For example, the predetermined unit region may be set to the region of 1 mm×1 mm.

The information on the gray level obtained by the image processing circuit 108 is transmitted to the defect detecting circuit 134. For example, the defect detecting circuit 134 has upper and lower thresholds around the average gray level, and has a function of recognizing the gray level as the defect to output the result when the gray level exceeds the threshold. The threshold level is already predetermined.

As mentioned above, the angle θ is obtained with respect to the sample 1 that becomes the inspection target when the electric field amplitude of the scattering light caused by the edge roughness becomes the minimum. Alternatively, before the inspection, the angle θ at which the electric field amplitude of the reflected light caused by the edge roughness becomes the minimum may be obtained using a substrate different from the sample 1. The table for the structure of the pattern formed on the substrate and the corresponding optimum angle θ is formed and stored in the magnetic disk unit 109. During the inspection, the table suitable to the substrate that becomes the inspection target is read from the magnetic disk unit 109, and the angle control circuit 14 controls the operation of the rotating unit 1006' such that the analyzer 1006 becomes the optimum angle according to the pattern.

The inspection apparatus of the embodiment can also have a review function in addition to the inspection function. As used herein, the review means an operation in which an operator determines whether the detected defect becomes a problem.

For example, a coordinate of a point, which is determined to be the defect by the comparing circuit 133 in FIG. 10, and the optical image and a reference image, which become a basis of the defect determination, are transmitted to a review unit (not illustrated). The operator performs the review by comparing the reference image that becomes the basis of the defect determination to the optical image including the defect. Specifically, the image of the defect point of the sample 1 is displayed using the optical system illustrated in FIG. 10. At the same time, the judgment condition of the defect determination, and the optical image and a reference image, which become the basis of the defect determination, are displayed on a screen of the control computer 110. The defect information obtained by the review is stored in the magnetic disk unit 109.

When at least one defect to be corrected is recognized by the review, the sample 1 and a defect information list are transmitted to a correction apparatus (not illustrated) that is of an external apparatus of the inspection apparatus 100. Because a correction method depends on whether a type of defect is a convex defect or a concave defect, the type of defect including the differentiation between the convex defect and the concave defect and the coordinate of the defect are added to the defect information list.

In the above example, the line and space pattern is cited as the repetitive pattern. However, the embodiment is not limited to the line and space pattern. The embodiment can be applied to the repetitive patterns such as a hole pattern as long as the repetitive pattern has the period at the resolution limit or less.

As described above, according to the inspection apparatus of the embodiment, even in the sample in which the repetitive pattern having the period at the resolution of the optical system or less is formed, the inspection can be performed while the defect to be detected and otherwise are distinguished from each other. Specifically, the scattering component caused by the edge roughness can be removed, and distinguished from the scattering component caused by the short-circuit defect or the open-circuit defect.

The light source that emits the DUV (Deep UltraViolet radiation) light can be used in the inspection apparatus of the embodiment. Therefore, the inspection can be performed without generating the throughput degradation, which becomes a problem in the case that the EB (Electron Beam) is used as the light source.

The present invention is not limited to the embodiments described and can be implemented in various ways without departing from the spirit of the invention.

For example, the inspection apparatus according to the present embodiment as shown in FIG. 10, includes the optical system as shown in FIG. 6, and can further include the optical system as shown in FIG. 7. That is, the inspection apparatus 100 as shown in FIG. 10, includes the non-polarizing beam splitter 1004, and can further include a polarizing beam splitter, a quarter-wave plate, and a half-wave plate. In this case, the optical image in which the reflected light caused by the edge roughness is removed can be obtained by adjusting the angle of the half-wave plate 3004a.

In the case that the optical system in FIG. 7 is used in the inspection apparatus of the present embodiment, the plane of light incidence with respect to the polarization beam splitter 3006 in FIG. 7 is matched with the direction of the repetitive pattern formed in the mask 3001, the direction of the optical axis of the half-wave plate 3004a is set to 23 degrees with respect to the direction of the repetitive pattern, and the direction of the optical axis of the quarter-wave plate 3004b is set to 45 degrees with respect to the direction of the repetitive pattern. Assuming that the light is not influenced by the repetitive pattern, the polarization direction of the linearly-polarized light, which is emitted from the light source 3002 and reflected by the polarization beam splitter 3006, is identical to the direction (that is, 0 degrees) of the repetitive pattern formed in the inspection target (in FIG. 7, mask 3001), and the linearly-polarized light becomes the linearly-polarized light having the polarization direction of 46 degrees with respect to the direction of the repetitive pattern when being transmitted through the half-wave plate 3004a. The linearly-polarized light then becomes the elliptically-polarized light having the polarization direction of 45 degrees with respect to the direction of the repetitive pattern when being transmitted through the quarter-wave plate 3004b. The elliptically-polarized light is reflected by the inspection target, transmitted through the quarter-wave plate 3004b, and becomes the linearly-polarized light having the polarization direction of 44 degrees with respect to the direction of the repetitive pattern. Then, the linearly-polarized light is transmitted through the half-wave plate 3004a to become the linearly-polarized light having the polarization direction of 2 degrees with respect to the direction of the repetitive pattern, and the linearly-polarized light is incident on the polarization beam splitter 3006.

In the optical system, the polarization direction of the light incident to the polarization beam splitter 3006 is rotated by the rotation of the half-wave plate, so that the polarization direction of the light reflected by the edge roughness can be set to 45 degrees. That is, when the reflected light caused by the edge roughness has the polarization direction of 43 degrees, the reflected light can be rotated by 2 degrees and set to 45 degrees. Therefore, the reflected light caused by the edge roughness can completely be prevented from being transmitted through the image capturing sensor 3007.

The above description of the present embodiment has not specified apparatus constructions, control methods, etc. which are not essential to the description of the invention, since any suitable apparatus constructions, control methods, etc. can be employed to implement the invention. Further, the scope of this invention encompasses all inspection apparatuses employing the elements of the invention and variations thereof, which can be designed by those skilled in the art.

What is claimed is:

1. An inspection apparatus comprising:
   an illumination optical system including:
   a light source that emits linearly-polarized light having a predetermined wavelength,
   a polarizing beam splitter directing the linearly-polarized light emitted from the light source, and
   a half-wave plate and a quarter-wave plate forming the linearly-polarized light directed by the polarizing beam splitter into elliptically-polarized light having a major axis in a direction except an angle in the ranges of −5 degrees to 5 degrees and 85 degrees to 95 degrees with respect to the length direction of a line of a repetitive pattern formed on a target to illuminate the target;
   an imaging optical system using the quarter-wave plate, the half-wave plate, and the polarizing beam splitter to transmit the light reflected by the target and further including an image capturing sensor that obtains an optical image of the pattern formed on the target based on the light reflected by the target and transmitted from the polarizing beam splitter to form an optical image of the reflected light of the target on the image capturing sensor;
   an image processor that obtains an average gray level A and a standard deviation of a gray level σ of the optical image with respect to each of a plurality of optical images acquired by changing the angle of the polarization of the reflected light incident on the image capturing sensor and detects a defect of the target using a specific optical image obtained at a selected angle of polarization of the reflected light which provides a value of (σ/√A) obtained from the standard deviation σ and the average gray level A that becomes a minimum.

2. The inspection apparatus according to claim 1, wherein the angle of polarization of the reflected light incident on the image capturing sensor is changed by rotating the angle of the half-wave plate.

3. The inspection apparatus according to claim 2, further comprising a rotating unit configured to adjust the angle of the half-wave plate, and
   wherein the angle of the half-wave plate is controlled such that the value of (σ/√A) acquired by the image processor becomes the minimum.

4. The inspection apparatus according to claim 1, comprising a storage unit in which information from the image processor is stored,
   wherein, with respect to a substrate in which a plurality of patterns having different structures are formed or a plurality of substrates in which single patterns having different structures are formed, the image processor acquires the angle of the half-wave plate in every structure of the pattern from the plurality of optical images of the targets acquired by changing the angle of the half-wave plate such that the value of (σ/√A) obtained from the standard deviation a of the gray level and the average gray level A becomes the minimum, and
   the image processor transmits the acquired angle of the half-wave plate to be stored in the storage unit, and controls, based on information stored in the storage unit, the angle of the half-wave plate to acquire the optical image of the pattern formed on the target of a sample to be inspected.

5. The inspection apparatus according to claim 4, further comprising a rotating unit configured to adjust the angle of the half-wave plate, and
   wherein the image processor controls an operation of the rotating unit based on the information stored in the storage unit.

* * * * *